US011962111B2

(12) United States Patent
Yingst et al.

(10) Patent No.: US 11,962,111 B2
(45) Date of Patent: Apr. 16, 2024

(54) SEALING ARRANGEMENTS FOR ELECTRICAL CONNECTORS PROVIDING ELECTRIC POWER FOR OIL OPERATIONS AND METHODS OF MANUFACTURE

(71) Applicant: Sonic Connectors Ltd., Odessa, TX (US)

(72) Inventors: Bradley Yingst, Friendswood, TX (US); Brody Whitley, Midland, TX (US); Matt Duckworth, Odessa, TX (US)

(73) Assignee: Sonic Connectors Ltd., Odessa, TX (US)

( * ) Notice: Subject to any disclaimer, the term of this patent is extended or adjusted under 35 U.S.C. 154(b) by 0 days.

(21) Appl. No.: 17/581,040

(22) Filed: Jan. 21, 2022

(65) Prior Publication Data

US 2023/0238735 A1 Jul. 27, 2023

(51) Int. Cl.

| | |
|---|---|
| ***H01R 13/52*** | (2006.01) |
| ***E21B 17/02*** | (2006.01) |
| ***H01R 43/00*** | (2006.01) |

(52) U.S. Cl.

CPC ....... *H01R 13/5221* (2013.01); *E21B 17/023* (2013.01); *E21B 17/028* (2013.01); *H01R 43/005* (2013.01)

(58) Field of Classification Search

CPC .................................................... E21B 17/028

See application file for complete search history.

(56) References Cited

U.S. PATENT DOCUMENTS

| | | | | |
|---|---|---|---|---|
| 3,425,024 A * | 1/1969 | Moulin | H01R 13/5205 | 439/600 |
| 4,133,593 A * | 1/1979 | Moulin | H01R 13/521 | 439/274 |
| 7,854,629 B1 * | 12/2010 | Albers | E21B 17/023 | 439/271 |

* cited by examiner

*Primary Examiner* — Vanessa Girardi

(74) *Attorney, Agent, or Firm* — Baker & McKenzie LLP

(57) ABSTRACT

An electrical connector is provided that includes a first conductor for receiving electrical power. A first seal is coupled to the first conductor for protecting the first conductor. An insulating body is coupled to the first conductor, and includes an electrical terminal that establishes electrical connections between the first conductor and a plurality of electrical terminal pins. A downhole cable is coupled to a first electrical terminal pin of the plurality of electrical terminal pins. The first electrical terminal pin establishes an electrical connection between the electrical terminal and the downhole cable to provide the electric power to the downhole cable. A second seal is coupled to the downhole cable for protecting the electrical connection between the electrical terminal and the downhole cable.

20 Claims, 4 Drawing Sheets

SEALING ARRANGEMENTS FOR ELECTRICAL CONNECTORS PROVIDING ELECTRIC POWER FOR OIL OPERATIONS AND METHODS OF MANUFACTURE

BACKGROUND

Drilling operations continually occur at great depths, where the pressure is increased on the equipment used for drilling. One of the main reasons drilling equipment fails is the electrical connectors are exposed to well fluid intrusion, heat, and poor insulation due to pressure and temperature. In addition to the effect of fluid intrusion, resulting in electric shorts between the connector's pins, the connector's geometry and materials also contribute to electric shorts occurring. The high voltages/currents, the short distance between the pins, and the presence of well fluids significantly increase the risk for shorts.

A new approach to addressing these issues is presented herein.

BRIEF SUMMARY

According to one aspect of the subject matter described in this disclosure, an electrical connector is provided. The electrical connector includes a first conductor for receiving electrical power. A first seal is coupled to the first conductor for protecting the first conductor. An insulating body is coupled to the first conductor, and includes an electrical terminal that establishes electrical connections between the first conductor and a plurality of electrical terminal pins. A downhole cable is coupled to a first electrical terminal pin of the plurality of electrical terminal pins. The first electrical terminal pin establishes an electrical connection between the electrical terminal and the downhole cable to provide the electric power to the downhole cable. A second seal is coupled to the downhole cable for protecting the electrical connection between the electrical terminal and the downhole cable.

According to another aspect of the subject matter described in this disclosure, a method of manufacturing an electrical connector is provided. The method includes providing a first conductor for receiving electrical power, and coupling a first seal to the first conductor for protecting the first conductor. Also, the method includes positioning the first conductor in an insulating body. The insulating body includes an electrical terminal that establishes electrical connections between the first conductor and a plurality of electrical terminal pins. In addition, the method includes coupling a downhole cable to a first electrical terminal pin of the plurality of electrical terminal pins. Moreover, the method includes establishing an electrical connection between the first electrical terminal pin and the downhole cable to provide the electric power. Furthermore, the method includes protecting, using a second seal, the downhole cable. The second seal is coupled to the downhole cable.

According to another aspect of the subject matter described in this disclosure, an electrical connector is provided. The electrical connector includes a first conductor for receiving electrical power. An insulating body is coupled to the first conductor. Also, the insulating body includes an electrical terminal that establishes electrical connections between the first conductor and a plurality of electrical terminal pins. A downhole cable is coupled to a first electrical terminal pin of the plurality of electrical terminal pins. The first electrical terminal pin establishes an electrical connection between the electrical terminal and the downhole cable to provide the electric power. A plurality of sealing members are coupled to the first conductor and the downhole cable. The plurality of sealing members protect the electrical connections used to deliver the electrical power from the first conductor to the downhole cable.

Additional features and advantages of the present disclosure are described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

Figure 1:
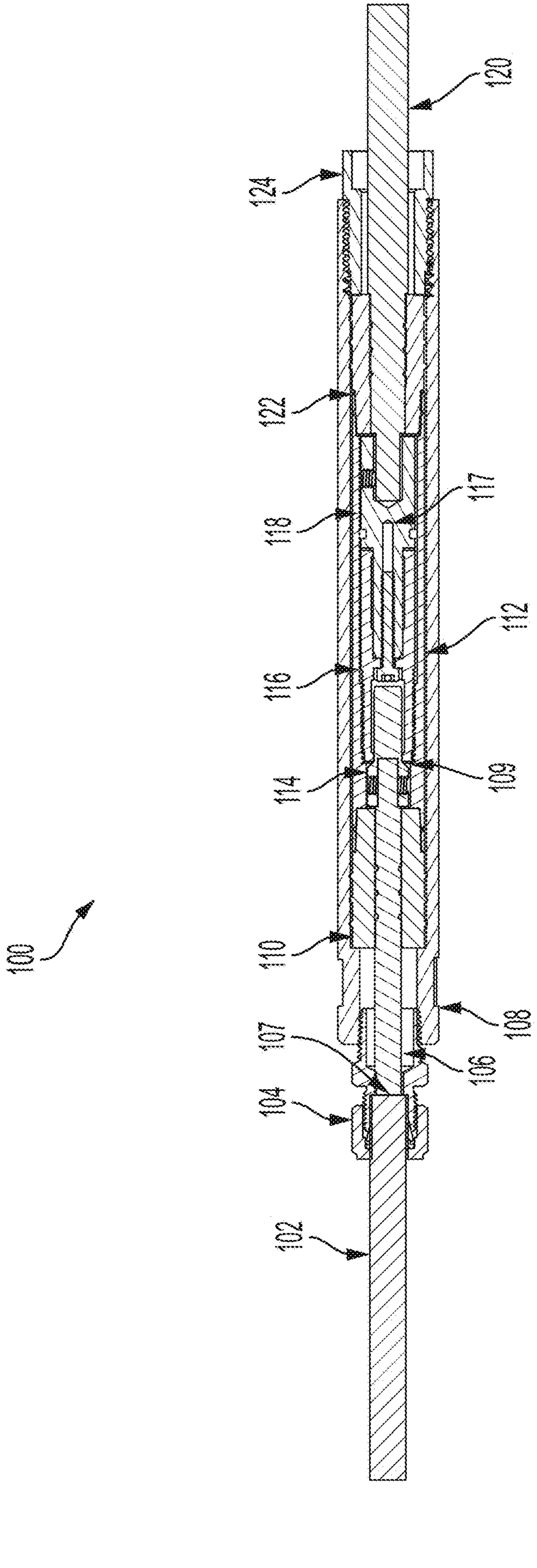
FIG. 1 is a schematic diagram of an exemplary embodiment of an electrical connector.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

The disclosure presents a novel design for an electrical connector requiring subsea connections and submersible pump connections. In particular, the disclosure describes an electrical connector that can handle the physical elements that deteriorate standard electrical connectors, such as high temperature, high pressure, and abrasive and/or corrosive fluids, including liquids and gases. Moreover, the compact design described in the disclosure allows the electrical connector to apply easily across multiple types of equipment, requiring subsea connections and/or submersible pump connections.

FIG. 1 illustrates an exemplary embodiment of an electrical connector 100, in accordance with some embodiments. In particular, the electrical connector 100 may include a capillary tubing 102 that is connected to a fitting structure 104. The fitting structure 104 may be used to connect the capillary tubing 102 to a main body 108 of electrical connector 100. Also, the fitting structure 104 may be designed to provide a leak-tight seal for pressures up to a suggested allowable pressure rating of the capillary tubing 102. A conductor 106 may be positioned within main body 108 and the fitting structure 104, and directly connected to the capillary tubing 102 at distal end 107 of electric conductor 106. A first single-piece seal 110 may be positioned on conductor 106 within main body 108 to protect conductor 106. Also, the first single-piece seal 110 may provide a seal that is highly resistant to high temperatures, chemical, and steam.

The conductor 106 may be connected to a first electric terminal pin 114 in a PEEK or similar dielectric insulator structure 112 at distal end 109 of electric conductor 106 to establish an electrical connection between first electric terminal pin 114 and capillary tubing 102. The diameter of conductor 106 at distal end 109 may be decreased relative to the diameter of conductor 106 at distal end 107. The first electric terminal pin 114 may be connected to an electrical terminal 116 to establish an electrical connection. The electrical terminal 116 may be connected to a second electrical terminal pin 118 to establish an electrical connection. A portion of the second electrical terminal pin 118 may extend horizontally (in the X-direction) into peek insulator structure 112. A downhole cable 120 may extend horizontally (in the X-direction) into second electrical terminal pin 118. Also, the downhole cable 120 may extend horizontally (in the X-direction) outward of main body 108. An electrical connection may be established for downhole cable 120 via a conductor 117 that may be connected to terminal 116. The conductor 117 may extend horizontally (in the X-direction) from electrical terminal 116 into electrical terminal pin 118. A second one piece seal 122 may be used to protect downhole cable 120, and provide a seal that is highly resistant to high temperatures, chemical, and steam. An adjustment nut 124 may be positioned beneath main body 108 to precisely adjust the position of main body 108 relative to downhole cable 120.

The electrical connector 100 may establish an electrical connection between capillary tubing 102 and downhole cable 120, thus providing downhole cable 120 sufficient electrical power to perform downhole operations requiring subsea connections, submersible pump connections, or the like.

In some implementations, the electrical conductor 106 may include metallic materials. In some embodiments, the electrical conductor 106 may include plastic materials. In some embodiments, the electrical conductor 106 may include materials that sustain high pressure and/or fluid intrusion. In some implementations, the electrical conductor 106 may be a high temperature and/or high performance insulating material, such as a perfluoroalkoxy (PFA) insulated conductor.

In some implementations, the main body 108 may include metallic materials. In some embodiments, the main body 108 may include plastic materials. In some embodiments, the main body 108 may include materials that sustain high pressure and/or fluid intrusion. In some implementations, the main body 108 may include carbon steel.

In some implementations, the electrical terminal 116 may include metallic materials. In some embodiments, the electrical terminal 116 may include plastic materials. In some embodiments, the electrical conductor 116 may include materials that sustain high pressure and/or fluid intrusion. In some implementations, the electrical terminal 116 may be protected using a plurality of armor cables.

In some implementations, the electrical terminal pins 114 and 118 may include metallic materials. In some embodiments, the electrical terminal pins 114 and 118 may include plastic materials. In some embodiments, the electrical terminal pins 114 and 118 may include materials that sustain high pressure and/or fluid intrusion.

In some implementations, the downhole cable 120 may include metallic materials. In some embodiments, the downhole cable 120 may include plastic materials. In some embodiments, the downhole cable 120 may include materials that sustain high pressure and/or prevent fluid intrusion. In some implementations, the downhole cable 120 may include an Ethylene Propylene Diene Monomer (EPDM) insulated copper conductor. In some implementations, the downhole cable 120 may include a lead jacket for downhole operations.

In some embodiments, the adjustment nut 124 may include a hexagonal carbon steel nut.

In some embodiments, the first single-piece seal 110 may protect against fluids entering electrical connector 100 and provide an additional barrier to prevent wellbore fluids and gas from entering the atmosphere at sustained overpressure, offset fracking events, or catastrophic failure. The first single-piece seal 110 may be an environmental protection seal.

Figure 2B:
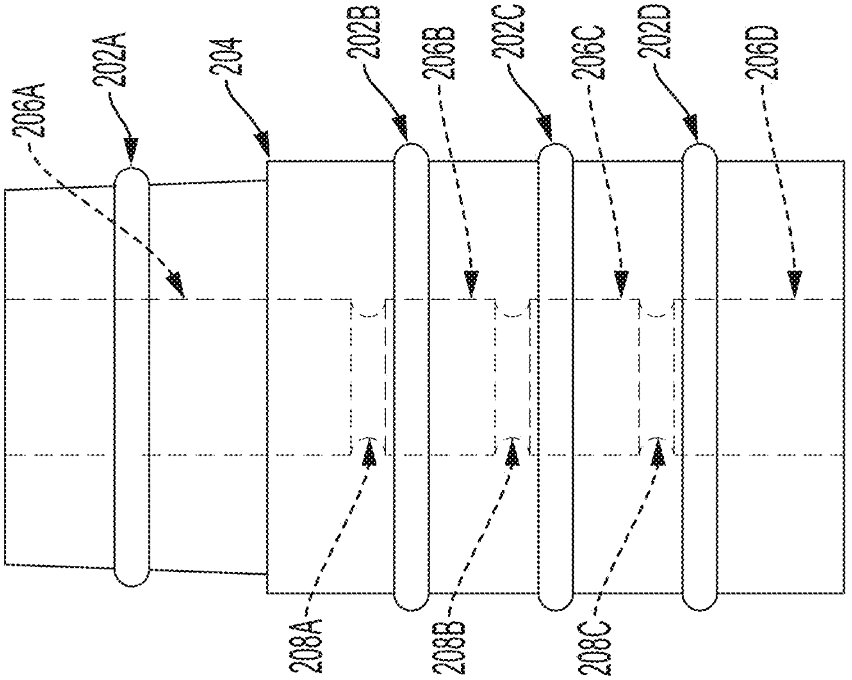
FIG. 2B is a schematic diagram of the cross-sectional view of the first single-piece seal.
Figure 2A:
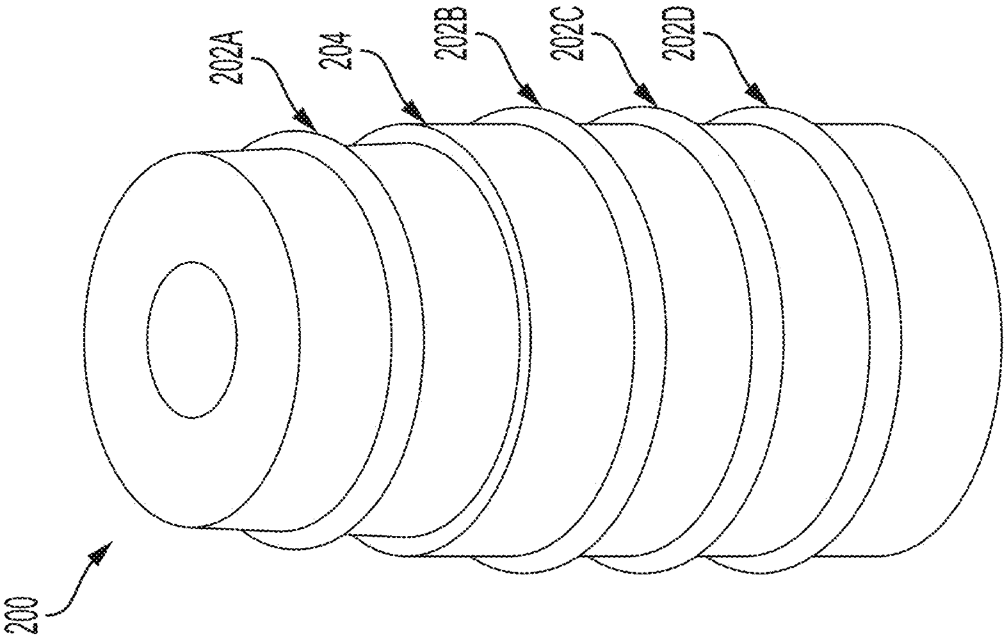
FIG. 2A is a schematic diagram of a first single-piece seal.

FIG. 2A is a schematic diagram of a first single-piece seal 200, in accordance with some embodiments. The first single-piece seal 200 may be similar to the first single-piece seal 110 of FIG. 1. The first single-piece seal 200 may be a single-piece seal member used to protect the conductor 106, and provide a seal that is highly resistant to high temperatures, chemicals, and steam. The first single-piece seal 200 may be a cylindrical body having a number of peripheral ridges 202A-202D. Also, the first single-piece seal 200 may include a protruding cylindrical element 204 providing stability and rigidity to first single-piece seal 200.

FIG. 2B is a cross-sectional view of the first single-piece seal 200, in accordance with some embodiments. In particular, FIG. 2B shows four cylindrical sections 206A-206D. Each of the cylindrical sections 206A-206D are connected to tapered cylindrical sections 208A-208C. The cylindrical sections 206A-206D and 208A-208C may be arranged to allow a portion of electric conductor 106 to be fitted within the first single-piece seal 200 to form a seal.

Figure 3B:
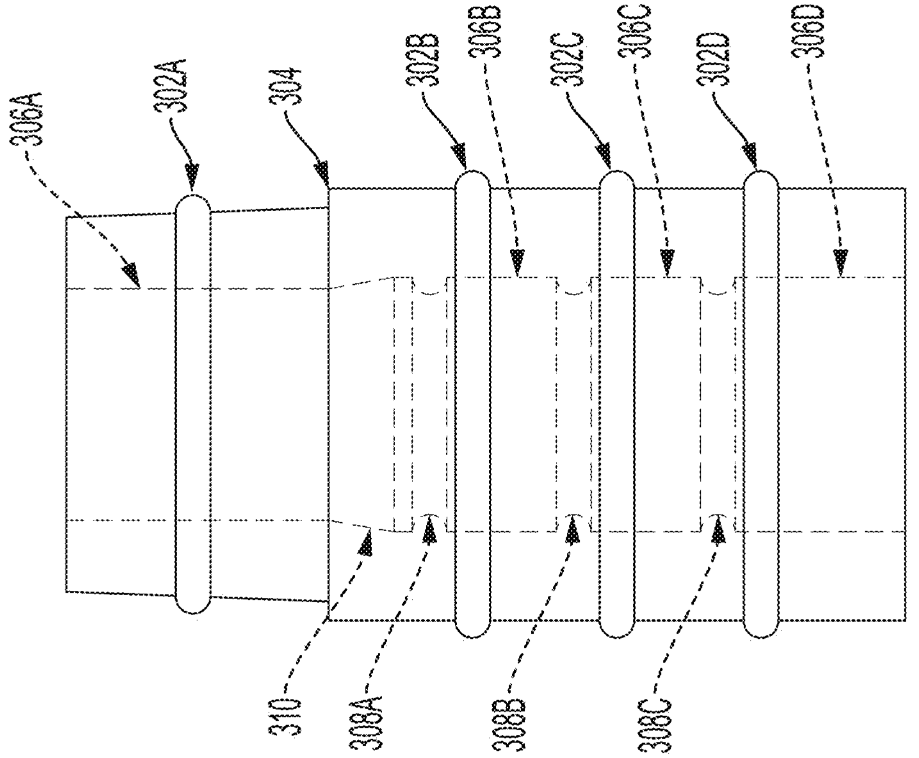
FIG. 3B is a schematic diagram of the cross-sectional view of the second single-piece seal.
Figure 3A:
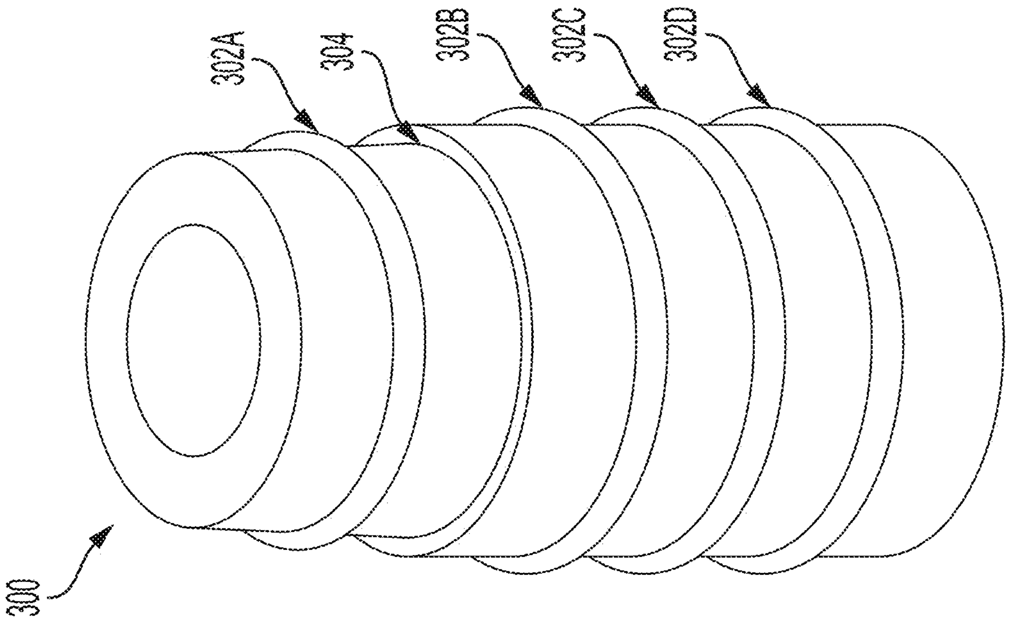
FIG. 3A is a schematic diagram of a second single-piece seal.

FIG. 3A is a schematic diagram of a second single-piece seal 300, in accordance with some embodiments. The second single-piece seal 300 may be similar to the second single-piece seal 122 of FIG. 1. The second single-piece seal 300 may be a single-piece seal member used to protect the downhole cable 120. The second single-piece seal 300 may be a cylindrical body having a number of peripheral ridges 302A-302D. Also, the second single-piece seal 300 may include a protruding cylindrical element 304 to provide stability and rigidity to second single-piece seal 300.

FIG. 3B is a schematic diagram of the cross-sectional view of the second single-piece seal 300, in accordance with some embodiments. In particular, FIG. 3B shows four cylindrical sections 306A-306D. Each of the cylindrical sections 306A-306D are connected to tapered cylindrical sections 308A-308C. The cylindrical sections 306A-206D and 308A-308C may be arranged to allow a portion of downhole cable 120 to be fitted within the second single-piece seal 200 to form a seal. A sector of cylindrical section 306A may include a flap 310 to strengthen the seal when a portion of the downhole cable 120 settles in cylindrical section 306A.

Figure 4:
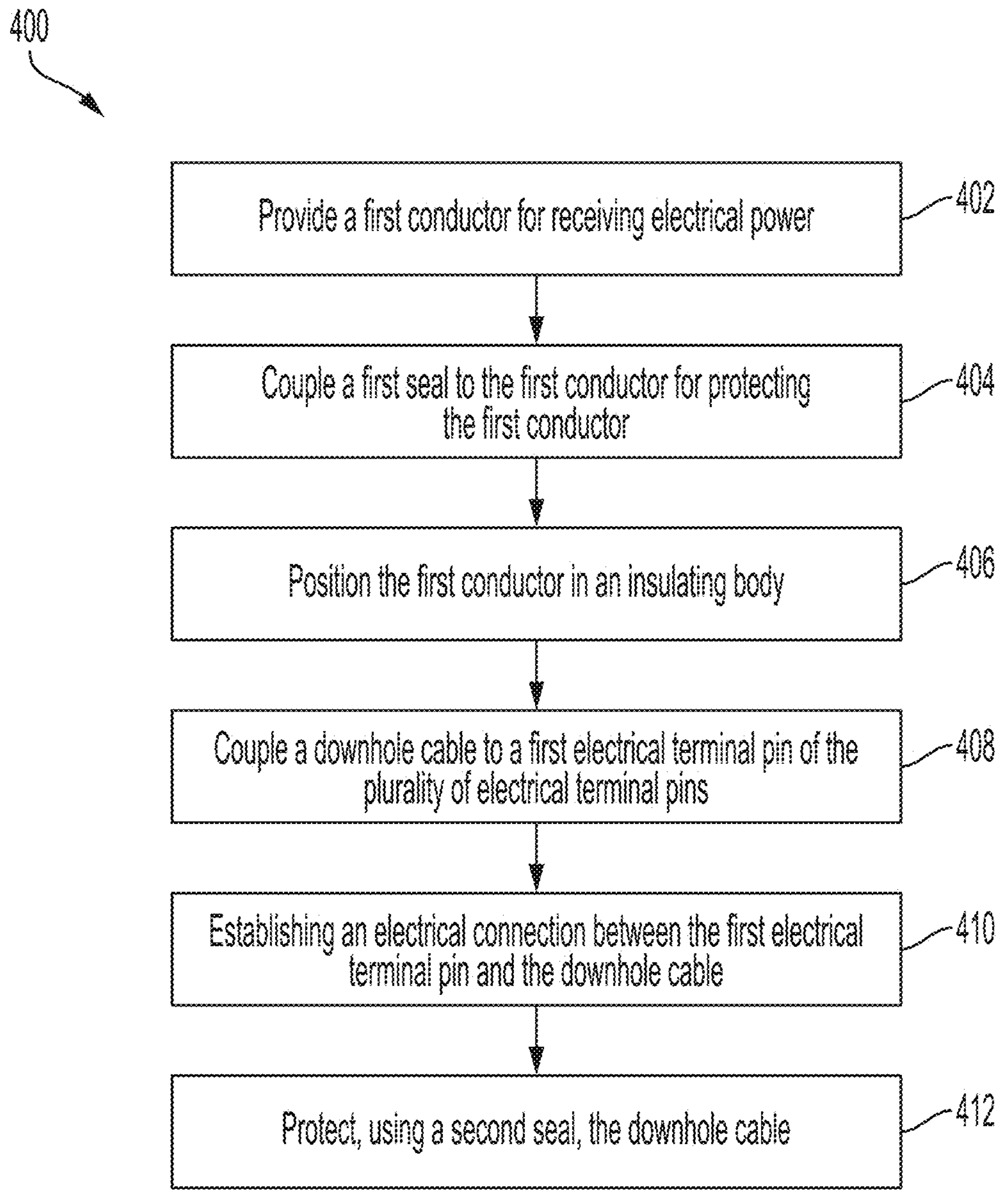
FIG. 4 is a process flow for a method of manufacturing an electrical connector.

FIG. 4 is a process flow 400 for a method of manufacturing an electrical connector, in accordance with some embodiments. Process flow 400 may be used to manufacture electrical connector 100 including its respective components, as shown in FIGS. 1-3. The method includes providing a first conductor for receiving electrical power, as shown in step 402. The first conductor may be conductor 106, as shown in FIG. 1. Also, the method includes coupling a first seal to the first conductor for protecting the first conductor, as shown in step 404. The first seal may be the first single-piece seal 110 of FIG. 1 or first single-piece seal 200 of FIG. 2. At step 406, the method includes positioning the first conductor in an insulating body. The insulating body may include an electrical terminal that establishes electrical connections between the first conductor and a plurality of electrical terminal pins. The insulating body may be PEEK insulator structure 112 of FIG. 1. The electrical terminal may be electrical terminal 110 of FIG. 1, and the electrical terminal pins may be electrical terminal pins 114 and 118 of FIG. 1.

Moreover, the method includes coupling a downhole cable to a first electrical terminal pin of the plurality of electrical terminal pins, as shown in step 408. The downhole cable may be downhole cable 120 of FIG. 1, and the first electrical terminal pin may be the electrical terminal pin 118 of FIG. 1. At step 410, the method includes establishing an electrical connection between the first electrical terminal pin and the downhole cable to provide the electric power. Furthermore, the method includes protecting the downhole cable using a second seal, as shown in step 412. The second seal is coupled to the downhole cable. The second seal may be the second single-piece seal 122 of FIG. 1 or second single-piece seal 300 of FIG. 3.

The disclosure presents a novel design for an electrical connector for use in downhole operations. In particular, the disclosure describes an electrical connector having a unique sealing arrangement that can provide electric power while handling the physical elements that deteriorate standard electrical connectors in downhole operations, such as high temperature, high pressure, and abrasive and/or corrosive fluids, including liquids and gases. Moreover, the compact design described in the disclosure allows the electrical connector to apply easily across multiple types of equipment, requiring subsea connections and/or submersible pump connections.

One particular advantage to the electrical connector described herein is that it allows for the wellhead system to remain concentric and not eccentric as is the case in traditional systems where the three leads are in the same cylindrical body. Rather, the three individual bodies 102, 106, and 120 of the electrical connector described herein allow for production tubing to be centralized, which in turn, provides cost savings in the exploration and production aspects of oil and gas. By keeping the production string centered, this allows for use of the wellhead adapter and hanger (as part of the wellhead system) for plunger lift, gas lift and the like. In the present disclosure, the three individual connectors can be used for each phase as opposed to one cylindrical larger unit for three phases. Indeed, the electrical connector described herein offers a sealing method above the contacts, thus offering a dual sealing technology that not only protects the electrical system from fluid and gas ingress, but also provides an additional barrier to prevent any well fluid and gas from entering the atmosphere at sustained overpressure. In this regard, the top seal offers the additional advantage of providing environmental protection.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. An electrical connector, comprising:
- a first conductor for receiving electrical power from and connecting to an electrical power source;
- an insulating body coupled to the first conductor, the insulating body having an electrical terminal that establishes electrical connections between the first conductor and a plurality of electrical terminal pins;
- a downhole cable coupled to a first electrical terminal pin of the plurality of electrical terminal pins, the first electrical terminal pin establishing an electrical connection between the electrical terminal and the downhole cable to provide the electric power to the downhole cable;
- a first seal and second seal, each comprising a substantially cylindrical body having a plurality of peripheral ridges, having a semi-circular profile, protruding outward from the substantially cylindrical body; and
- an interior of the substantially cylindrical body comprising two or more cylindrical sections connected to each other by a tapered cylindrical section tapering inward towards an axial center of the substantially cylindrical body; wherein:

the peripheral ridges and tapered cylindrical sections are separate and distinct from each other, the first seal is coupled to the first conductor for protecting the first conductor, and the second seal is coupled to the downhole cable for protecting the electrical connection between the electrical terminal and the downhole cable.

2. The electrical connector of claim 1, wherein the first conductor comprises a high temperature and/or high performance insulating material.

3. The electrical connector of claim 1, wherein the first seal is a single-piece perfluoroalkoxy (PFA) seal.

4. The electrical connector of claim 1, wherein the second seal is a single-piece cable seal.

5. The electrical connector of claim 1, wherein the second seal has a larger internal diameter than the first seal.

6. The electrical connector of claim 1, wherein the electrical terminal pins and the electrical terminal are positioned within the insulating body.

7. The electrical connector of claim 1, wherein the insulating body is positioned within a main body.

8. The electrical connector of claim 7, wherein the main body comprises carbon steel.

9. An electrical connector, comprising:

a first conductor for receiving electrical power from and being connected to an electrical power source;

an insulating body coupled to the first conductor, the insulating body having an electrical terminal that establishes electrical connections between the first conductor and a plurality of electrical terminal pins;

a downhole cable coupled to a first electrical terminal pin of the plurality of electrical terminal pins, the first electrical terminal pin establishing an electrical connection between the electrical terminal and the downhole cable to provide the electric power to the downhole cable; and a plurality of sealing members each comprising a substantially cylindrical body having a plurality of peripheral ridges, having a semi-circular profile, protruding outward from the substantially cylindrical body, the plurality of sealing members protecting the electrical connections used to deliver the electrical power from the first conductor to the downhole cable, wherein:

an interior of the substantially cylindrical body of the plurality of sealing members each further comprising two or more cylindrical sections connected to each other by a tapered cylindrical section tapering inward towards an axial center of the substantially cylindrical body, and the peripheral ridges and tapered cylindrical sections are separate and distinct from each other.

10. The electrical connector of claim 9, further comprising a second conductor extending from the electrical terminal into the first electrical terminal pin of the plurality of electrical terminal pins to establish the electrical connection between the electrical terminal and the downhole cable.

11. The electrical connector of claim 9, wherein the plurality of sealing members comprise a first sealing member coupled to the first conductor, and wherein the first sealing member includes a cylindrical element for providing stability and rigidity for the first sealing member.

12. The electrical connector of claim 11, wherein the plurality of sealing members comprise a second sealing member coupled to the downhole cable, and wherein the second sealing member has a larger internal diameter than the first seal.

13. A method of manufacturing an electrical connector, comprising:

providing a first conductor for receiving electrical power from and connecting to an electrical power source;

coupling a first seal to the first conductor for protecting the first conductor;

positioning the first conductor in an insulating body, the insulating body having an electrical terminal that establishes electrical connections between the first conductor and a plurality of electrical terminal pins;

coupling a downhole cable to a first electrical terminal pin of the plurality of electrical terminal pins;

establishing an electrical connection between the first electrical terminal pin and the downhole cable to provide the electric power; and protecting the downhole cable with a second seal coupled to the downhole cable, wherein:

the first seal and the second seal each comprise a substantially cylindrical body and a plurality of peripheral ridges having semi-circular profile, protruding outward from the substantially cylindrical body, an interior of the substantially cylindrical body of the first seal comprising two or more cylindrical sections connected to each other by a tapered cylindrical section tapering inward towards an axial center of the substantially cylindrical body, and the peripheral ridges and tapered cylindrical sections are separate and distinct from each other.

14. The method of claim 13, wherein providing the first conductor includes providing the first conductor having a high temperature and/or high performance insulating material.

15. The method of claim 13, wherein coupling the first seal includes coupling a single-piece perfluoroalkoxy (PFA) seal to the first conductor.

16. The method of claim 13, wherein protecting, using the second seal, the downhole cable includes coupling a single-piece cable seal to the downhole cable.

17. The method of claim 13, wherein the second seal has a larger internal diameter than the first seal.

18. The method of claim 13, wherein positioning the first conductor in the insulating body includes positioning the plurality of electrical terminal pins and the electrical terminal within the insulating body.

19. The method of claim 13, wherein positioning the first conductor in the insulating body includes positioning the insulating body within a main body.

20. The method of claim 19, wherein the main body comprises carbon steel.

* * * * *